(12) United States Patent
Seraj et al.

(10) Patent No.: US 11,792,010 B2
(45) Date of Patent: *Oct. 17, 2023

(54) DISTRIBUTED MACHINE LEARNING VIA SECURE MULTI-PARTY COMPUTATION AND ENSEMBLE LEARNING

(71) Applicant: Dapper Labs Inc., Vancouver (CA)

(72) Inventors: Ramtin Mehdizadeh Seraj, Burnaby (CA); Nicholas Chow, Vancouver (CA)

(73) Assignee: Dapper Labs, Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/666,801

(22) Filed: Feb. 8, 2022

(65) Prior Publication Data

US 2022/0166624 A1   May 26, 2022

Related U.S. Application Data

(63) Continuation of application No. 17/363,615, filed on Jun. 30, 2021, now Pat. No. 11,265,166.

(Continued)

(51) Int. Cl.
  *G06F 21/00*   (2013.01)
  *G06N 20/00*   (2019.01)
  (Continued)

(52) U.S. Cl.
  CPC ............ *H04L 9/3218* (2013.01); *G06N 5/04* (2013.01); *G06N 20/00* (2019.01)

(58) Field of Classification Search
  CPC ....... H04L 9/3218; H04L 9/50; H04L 9/3239; G06N 5/04; G06N 20/00; G06N 20/20
  See application file for complete search history.

(56) References Cited

U.S. PATENT DOCUMENTS 10,229,357 B2 * 3/2019 Jin .................... G06N 20/00
11,081,219 B1 * 8/2021 Dods ................ G06N 20/00
(Continued)

FOREIGN PATENT DOCUMENTS

CN         115735212 A    3/2023
WO   WO-2018017467 A1 *  1/2018 ......... G06F 21/6245
(Continued)

OTHER PUBLICATIONS

Franziska Boenisch; Verena Battis; Nikolas Buchmann; Maija Poikela; "I Never Thought About Securing My Machine Learning Systems": A Study of Security and Privacy Awareness of Machine Learning Practitioners; MuC '21: Proceedings of Mensch und Computer 2021; Sep. 2021; pp. 520-546 (Year: 2021).*

(Continued)

*Primary Examiner* — Fatoumata Traore
*Assistant Examiner* — Courtney D Fields
(74) *Attorney, Agent, or Firm* — Schwegman Lundberg & Woessner, P.A.

(57) ABSTRACT

Systems and methods for combining input data and machine learning models that remain secret to each entity are described. This disclosure can allow groups of entities to compute predictions based on datasets that are larger and more detailed collectively than individually, without revealing their data to other parties. This is of particular use in artificial intelligence (AI) tasks in domains which deal with sensitive data, such as medical, financial, or cybersecurity.

20 Claims, 4 Drawing Sheets

Related U.S. Application Data

(60) Provisional application No. 63/046,362, filed on Jun. 30, 2020.

(51) Int. Cl.
  *H04L 9/32* (2006.01)
  *G06N 5/04* (2023.01)
  *G06F 21/64* (2013.01)

(56) References Cited

U.S. PATENT DOCUMENTS

| | | |
|---|---|---|
| 11,265,166 B2 | 3/2022 | Seraj et al. |
| 2018/0018590 A1* | 1/2018 | Szeto ............... G06N 20/00 |
| 2021/0058231 A1* | 2/2021 | Nogayama ............ G06F 21/64 |
| 2021/0409220 A1 | 12/2021 | Seraj et al. |
| 2022/0239487 A1 | 7/2022 | Seraj et al. |

FOREIGN PATENT DOCUMENTS

| | | |
|---|---|---|
| WO | 2019231578 | 12/2019 |
| WO | WO-2022003420 A1 | 1/2022 |

OTHER PUBLICATIONS

Wang, Qigang, et al., "BDML: Blockchain-Based Distributed Machine Learning for Model Training and Evolution", Second International Symposium on Foundations and Applications of Blockchain (FAB '19), Los Angeles, California, Apr. 5, 2019 (Year: 2019), 12 pages.

Zhu, Yan, et al., "Secure Smart Contract System Built on SMPC Over Blockchain", IEEE International Conferences on Internet of Things, Green Computing and Communications, Cyber, Physical and Social Computing, Smart Data, Blockchain, Computer and Information Technology, Congress on Cybermatics, Publisher: IEEE, Mar. 2018 (Year: 2018), pp. 1539-1544.

U.S. Appl. No. 17/363,615, Non Final Office Action dated Sep. 3, 2021, 6 pgs.

U.S. Appl. No. 17/363,615, Notice of Allowance dated Jan. 10, 2022, 19 pgs.

U.S. Appl. No. 17/363,615, Response filed Dec. 2, 2021 to Non Final Office Action dated Sep. 3, 2021, 10 pgs.

U.S. Appl. No. 17/669,202 Preliminary Amendment filed Apr. 14, 2022, 8 pgs.

U.S. Appl. No. 17/669,202, Non Final Office Action dated Mar. 30, 2023, 8 pgs.

International Application Serial No. PCT/IB2021/000450, International Preliminary Report on Patentability dated Aug. 23, 2022, 7 pgs.

International Application Serial No. PCT/IB2021/000450, International Search Report dated Oct. 6, 2021, 4 pgs.

International Application Serial No. PCT/IB2021/000450, Response filed Nov. 24, 2021 to International Search Report and Written Opinion dated Oct. 6, 2021, 8 pgs.

International Application Serial No. PCT/IB2021/000450, Response to Written Opinion filed Apr. 29, 2022 to Written Opinion dated Oct. 6, 2021, 17 pgs.

International Application Serial No. PCT/IB2021/000450, Written Opinion dated Oct. 6, 2021, 7 pgs.

"U.S. Appl. No. 17/669,202, Response filed Jun. 14, 2023 to Non Final Office Action dated Mar. 30, 2023", 9 pgs.

* cited by examiner

DISTRIBUTED MACHINE LEARNING VIA SECURE MULTI-PARTY COMPUTATION AND ENSEMBLE LEARNING

CROSS-REFERENCE TO RELATED APPLICATIONS

This application is a continuation of U.S. patent application Ser. No. 17/363,615, filed Jun. 30, 2021, entitled "DISTRIBUTED MACHINE LEARNING VIA SECURE MULTI-PARTY COMPUTATION AND ENSEMBLE LEARNING", which claims priority to U.S. Provisional Patent Application Ser. No. 63/046,362, filed Jun. 30, 2020, entitled "DISTRIBUTED MACHINE LEARNING VIA SECURE MULTI-PARTY COMPUTATION AND ENSEMBLE LEARNING", which are hereby incorporated herein by reference in their entirety.

TECHNICAL FIELD

The disclosed technology relates generally to distributed machine learning via secure multi-party computation and ensemble learning.

BACKGROUND

With current machine learning systems, organizations with large datasets are able to effectively generate predictions and realize the advantages conferred by machine learning. Most other companies do not have enough data individually to generate very accurate predictions, if at all. These companies may produce effective machine learning predictions by joining together and sharing data, however, data-sharing between companies (if at all) requires an overabundance of trust, technology, and is significantly at odds with protecting the privacy of user data.

BRIEF SUMMARY OF EMBODIMENTS

Systems, methods, and computer readable media are disclosed for combining machine learning (ML), blockchain, and/or cryptographic techniques. The system can enable the computation of ML output using models and inputs, and the ML models and inputs can stay secret to their respective providers. This allows groups of entities to compute predictions based on datasets that are larger and more detailed collectively than individually, without revealing their data to other parties. This is of particular use in artificial intelligence (AI) tasks in domains which deal with sensitive data, such as medical, financial, or cybersecurity.

In some examples, the systems, methods, and computer readable media can provide a computed-generated response to a requesting device from a set of distributed machine learning (ML) models. For example, the requester may submit an electronic message that corresponds with a single response. A controller may parse and/or translate the request to determine a set of ML models that are trained to determine a response to the request. The set of ML models may be associated with a different entity and be trained to provide the response based on various training data input. Each of the set of the ML models may be executed by a computing node corresponding with each entity that is configured to provide the response for that ML model. Each of the responses may be first responses that are provided to a second computational layer that assigns weights to. each of the first responses. The second computational layer may aggregate the weighted first response to generate a second combined response, which can be provided back to the requesting device.

In some examples, the first and second combined responses may be binary responses (e.g., yes/no, 1/0, etc.). For example, the request may correspond with a question (e.g., "should I wear shorts today" or "should I purchase the financial equity at this price," etc.) and the response may provide a prediction corresponding with that question.

In some examples, the entity sources of each first response may be distributed and anonymous to the requesting device. The entities may be private and unknown to the requester. The entity corresponding with the second computational layer (e.g., a central computer) may provide an allocation of credits to each of the entity sources for providing each first response (e.g., tokens, payment, etc.). The distributed system may help remove the requirement that a single ML model needs to be generated centrally to provide these response predictions. Individual entity modelers or controllers with similar data may form assemblies. Their models may be generated independently from one another outside of this system.

Each entity may be permitted to receive the request and provide a response to the request based on a verification process of the entity. For example, each entity may store a shared secret. The shared secret may be provided to the second computational layer to confirm the permissibility of the entity to provide the response.

In some examples, a history of responses may help generate the weights used to determine the weighted responses for each of the entity sources and to generate the second combined response. For example, a first entity may provide correct responses 60% of the time that they generate responses to a request and a second entity may provide correct responses 40% of the time that they generate responses to the same request. The weight associated with responses from the first entity may be greater than the second entity. In some examples, the weights may be limited to a characteristic of the request and multiple weights may be associated with each entity (e.g., one weight corresponding with each characteristic, etc.).

Several technical problems are found in the related technology space. For example, to generate an ML model, the model may be trained prior to accepting production-level data and the corresponding predictions. The first step is the collection of the training data, which includes many (thousands to billions) sets of data points. The data may then be prepared for machine learning (e.g., by parsing, cleaning, etc.). Algorithms may be run against the cleaned data to generate the ML model. The model may use a series of weights that correlate the relative importance of the input type to the output prediction. Once a model is generated, predictions can be made by running the model against prediction input data, which is just one set of data points for each prediction.

Computing predictions may tend to be orders of magnitude faster than creating the model to begin with. For example, while calculating predictions may take milliseconds, model generation tends to take minutes, hours, or even days of computation. There are generally three strategies to make the data used for machine learning private, including secure model generation or Secure Multi-Party Computation (SMPC), aggregating individual model updates, and obfuscating model independent output.

One traditional approach is secure model generation or SMPC that can be used to obfuscate the data provided for model generation. This may allow models to be generated where the underlying data used is not revealed to the model-maker. However, SMPC takes even more time to generate a ML model than it does already (e.g., by orders of magnitude more expensive), which makes model training time infeasibly long.

Another traditional approach is aggregating individual model updates or federated machine learning. In aggregating individual model updates, the system may use a central controller to receive model updates from individual models and generate a new model. For example, models may send the differences they have found to the main model/controller, which analyzes those differences when generating a new model. This may allow models to be generated without directly exposing input data to the main model/controller. However, those updates may be processed, distributed, and controlled by a single central entity. Analyzing model updates from individuals can reveal information about the input data, which may correspond with a risk that is compounded by the single-entity aggregator.

Another traditional approach is obfuscating model input data. In obfuscating model input data. The input data is altered to reduce the readability of the data (e.g., tokenizing, encrypting, etc.). For example, differential privacy techniques may attempt to obfuscate individual data before it is sent to model generators. This allows for faster model generation. However, this can lead to additional noise in the model and render the model less accurate.

The traditional approaches may either be computationally very expensive for complex models, rely on trusting a single entity lo compute the models, or introduce noise to the model which decreases the accuracy. The approaches so far may have assumed that privacy controls need to be added before or during the model generation step.

There may be additional problems in providing predictions without revealing input data to the modeler/controller or model weight data to the requester for predictions. For example, traditional approaches may rely on single model providers that are either simply trusted, or input data is protected by simple encryption. However, even encrypted input and model data may lead to problems, including increased computation needed to implement the encryption, back-generation of models, and/or detect or remove malicious data. For example, performing computations on encrypted data requires a lot of computational power. This means prediction calculation times increase from milliseconds to minutes, or longer depending on complexity. In another example, in relation to back-generation of models, it is possible to reveal information about a specific model by taking many predictions generated by the model and comparing those predictions to the inputs given. This may generate data security issues. In yet another example, malicious data or prediction providers may be incorporated with the model if inputs or model weights are obscured, which can allow the malicious input to reveal input data simply by adjusting input data (or weightings, if predictions are revealed to prediction-makers). So even if one was able to generate models in secret, there may be additional problems to calculate predictions to untrusted requesters.

In the present disclosure, systems and methods are disclosed to implement predictions using one or more ML models. For example, upon submission of the input data, both model weight and prediction input data may be validated to be within acceptable ranges. The prediction inputs and the models evaluating the inputs may be split among multiple computational parties and the computational parties may execute the evaluations. When the individual model predictions are determined, they may be algorithmically combined. In some examples, this process may allow for predictions without requiring model providers to reveal their training data or model weights, and without requiring the prediction input data to be revealed to anyone but the prediction requester.

Technical improvements are described throughout the application. In some examples, models may be generated by the input data holders, which can remove the model generation risk entirely. Pre-validation of model weights and prediction inputs may prevent malicious input data from being incorporated in a training model or from being used to generate a prediction from the trained ML model. In some examples, splitting each model and input among multiple computational parties may remove the single-entity risk and reveal no sensitive data to computational parties. Combining the results of multiple models before revealing the prediction may also eliminate the back-generation of individual models.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
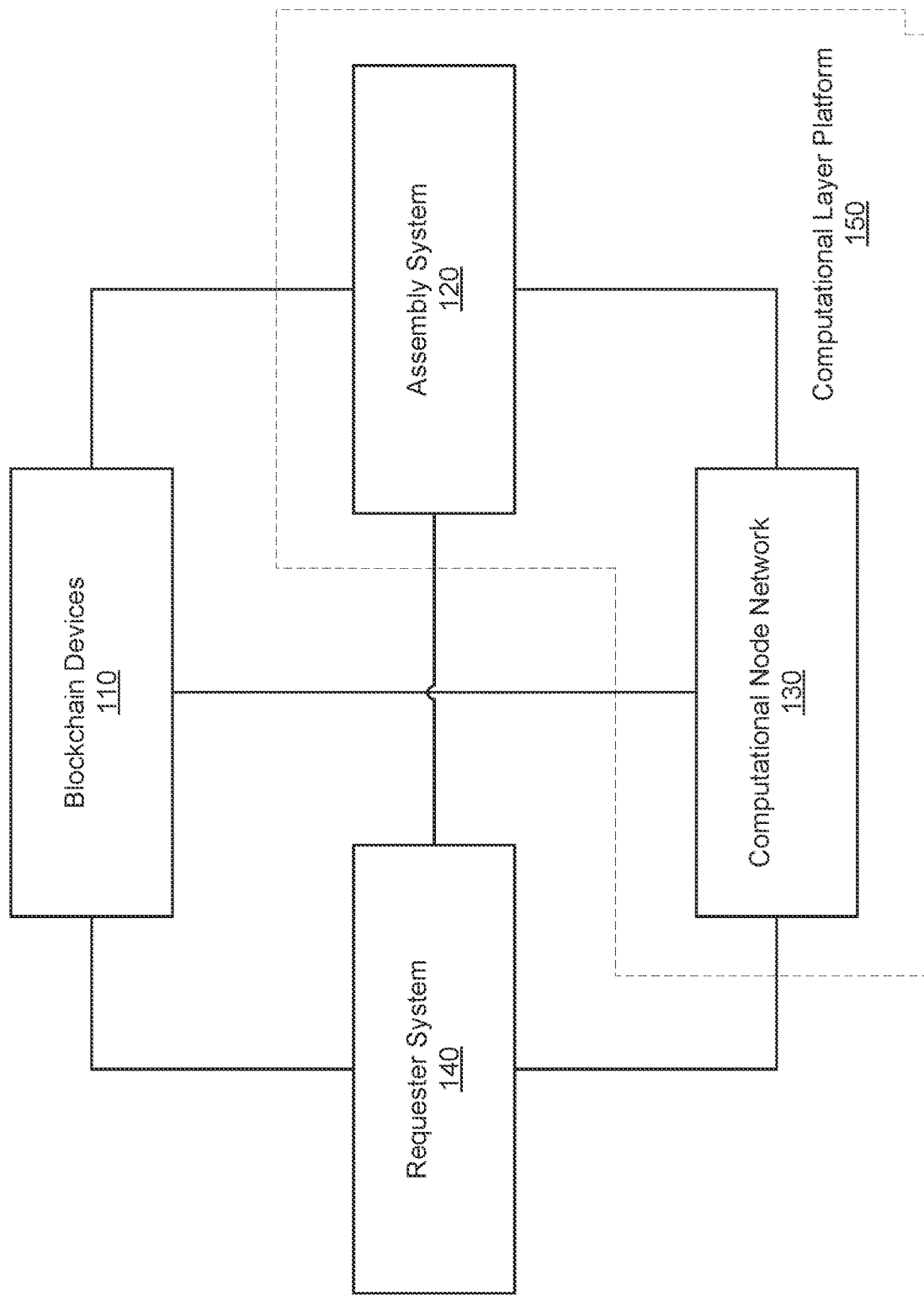
FIG. 1 is an illustrative system, in accordance with the embodiments disclosed herein.

FIG. 1 is an illustrative system, in accordance with the embodiments disclosed herein. In some examples, various types of devices and systems may interact to compute predictions based on datasets that are larger and more detailed collectively than individually, without revealing their data to other parties. The illustrative system may combine machine learning (ML), blockchain, and/or cryptographic techniques. The system can enable the computation of ML output using models and inputs, and the ML models and inputs can stay secret to their respective providers. This allows groups of entities to compute predictions based on datasets that are larger and more detailed collectively than individually, without revealing their data to other parties. The devices and systems may comprise, for example, blockchain devices 110, assembly system 120, computational node network 130, and requester system 140. In some examples, computational node network 130 and requester system 140 may be combined as a single computational layer platform 150.

Blockchain devices 110 may comprise one or more devices that store a list of records (e.g., blocks) that are linked together using cryptography. Each block may contain a cryptographic hash of the previous block, a timestamp, and transaction data (e.g., represented as a Merkle tree). The timestamp proves that the transaction data existed when the block was published in order to generate a corresponding hash. As blocks each contain information about the block previous to it, they form a chain, with each additional block reinforcing the ones before it. Blockchain devices 110 may be resistant to modification of their data because, once recorded, the data in any given block cannot be altered retroactively without altering all subsequent blocks.

Blockchain devices 110 may be managed by a peer-to-peer network for use as a publicly distributed ledger, where nodes collectively adhere to a protocol to communicate and validate new blocks. In some examples, blockchain devices 110 may securely store data with a high Byzantine fault tolerance (e.g., in excess of a threshold value).

Blockchain devices 110 may form a blockchain-based smart contract platform. This may correspond with Ethereum® or other smart contract platform. The smart contract may correspond with a computer program or a transaction protocol which is intended to automatically execute, control, or document legally relevant events and actions according to the terms of a contract or an agreement. In some examples, the smart contract is a self-executing contract with the terms of the agreement between buyer and seller being directly written into lines of code.

Blockchain devices 110 may be configured to coordinate assembly system 120, computational node network 130, and requester system 140.

Assembly system 120 may comprise one or more modelers/controllers that create one or more smart contracts that are implemented with blockchain devices 110. The smart contracts may define the data structure of the features to be used, acceptable ranges for each feature, and/or the ensemble method to be used. Individual modelers with their own data may come together to form assembly system 120.

Assembly system 120 may correspond with one or more entities that provide data. In some illustrative examples, the entities are small-to-mid sized banks as individual modelers. Each entity may receive, process, and store client information such as transaction history and existing account values. In some examples, the data may remain private to each individual bank to be in accordance with regulations. The entities may then form an assembly with the goal of predicting which customers were likely to want a mortgage in the next year using various data, including transaction history, open account types, and/or values of accounts.

The one or more smart contracts may comprise various information. For example, the smart contract may comprise features outlined in a vector with categorical or numerical features. The features may be normalized (i.e. all individually set to a value between 0 and 1). In this case: features= ((accountype$_1$, accountvalue$_2$), (accountype$_2$, accountvalue$_2$) . . . ). In another example, the smart contract may comprise valid ranges for each input feature, model weight, and/or prediction.

The one or more smart contracts may comprise functions to generate data. For example, the data may comprise each entity's ML model and/or input used to train the models.

The one or more smart contracts may comprise a number of secret-shares to be distributed among the nodes in computational node network 130. There may be a minimum value required to recreate the data. As an illustrative example, 40 secret-shares with at least 30 required to recreate the data.

The one or more smart contracts may comprise one or more ensemble learning techniques to combine individual model predictions. As an illustrative example, a weighted average where prediction$_{assembly}$=(weight$_1$*prediction$_1$+ weight$_2$*prediction$_2$, . . . ).

The one or more smart contracts may comprise parameters to initiate a prediction. For example, requester 140 may provide a correct shared secret. In another example, requester 140 may provide a correct credit amount to initiate the prediction. The credit may be transferred to one or more entities that provide a first layer response to generate the prediction response. In some examples, a cost per prediction and/or distribution path to one or more computational nodes may be stored.

The one or more smart contracts may comprise a message authentication code protocol (MAC) used to validate computation. For example, the MAC may correspond with a cryptographic checksum on data that uses a session key to detect both accidental and intentional modifications of the data. The MAC may be generated based on two or more inputs, including a message and a secret key known only to the originator of the message and its intended recipient(s).

Individual entities in assembly system 120 may create their own predictive models with their own weights, using their own data (as defined herein), without revealing that data to anyone else. The smart contract may be ready for prediction requests after the creation of the corresponding prediction model.

Computational node network 130 may comprise one or more layers of nodes, processors, or other computer devices (e.g., CPU/GPU, memory, machine readable media, etc.). The first layer of computational nodes may send results of their shares to a second layer of computational nodes. The second layer of computational nodes may aggregate results. The aggregated results may be transmitted to requester system 140.

In some examples, computational node network 130 may comprise the first layer of nodes that generate a first response and the first response may be transmitted to assembly 120. Assembly 120 may aggregate the first responses to generate the second response (e.g., as the second layer of computation or modeling). The aggregated results may be transmitted to requester system 140.

Requester system 140 may comprise an entity that provides a question that can be answered by a predicted response. In some examples, the predicted response may be generated through multiple layers of predictions and computing, including a first layer of ML models and a second layer of aggregation and weights applied to the responses generated by the first layer. Requester system 140 may combine the aggregated results from computational node network 130 to generate a final prediction value.

In some examples, these devices and systems may combine ensemble learning methods with secret sharing protocols to perform AI tasks using models from multiple providers and prediction inputs from requester system 140, each device or system of whom does not trust the other. In some examples, all model weights and input data may stay secret to their respective providers.

In some examples, Secret-shared Non-Interactive Proofs (SNIPs) may be used to prove valid model weights and input data. For example, the SNIPs process may receive input data at each of the nodes in the computational node network 130. Requester 140 may provide the prediction input to assembly 120, which confirms that the prediction input is within a valid range (e.g., 0 to 1, etc.) and the weight is determined for each node that intends to provide a response. In some examples, the prediction input and weight may correspond with a characteristic of the request. The smart contract may store one or more rules that are compared with the prediction input to confirm that the prediction input is within the valid range. If within the valid range, computational node network 130 may generate the response and provide the response to the assembly 120, which may apply the weight corresponding with the node of the computational node network 130.

In some examples, the implementation uses computational node network 130 coordinated by blockchain devices 110, which may provide smart contracts, ledger accounting, control, routing, and any other meta functions required. Assembly system 120 may use smart contracts on blockchain devices 110 (e.g., a blockchain-based smart contract platform) to provide the details required for prediction requests. The individual predictions generated by assembly system 120 may be combined using ensemble learning methods and then revealed requester system 140.

Figure 2:
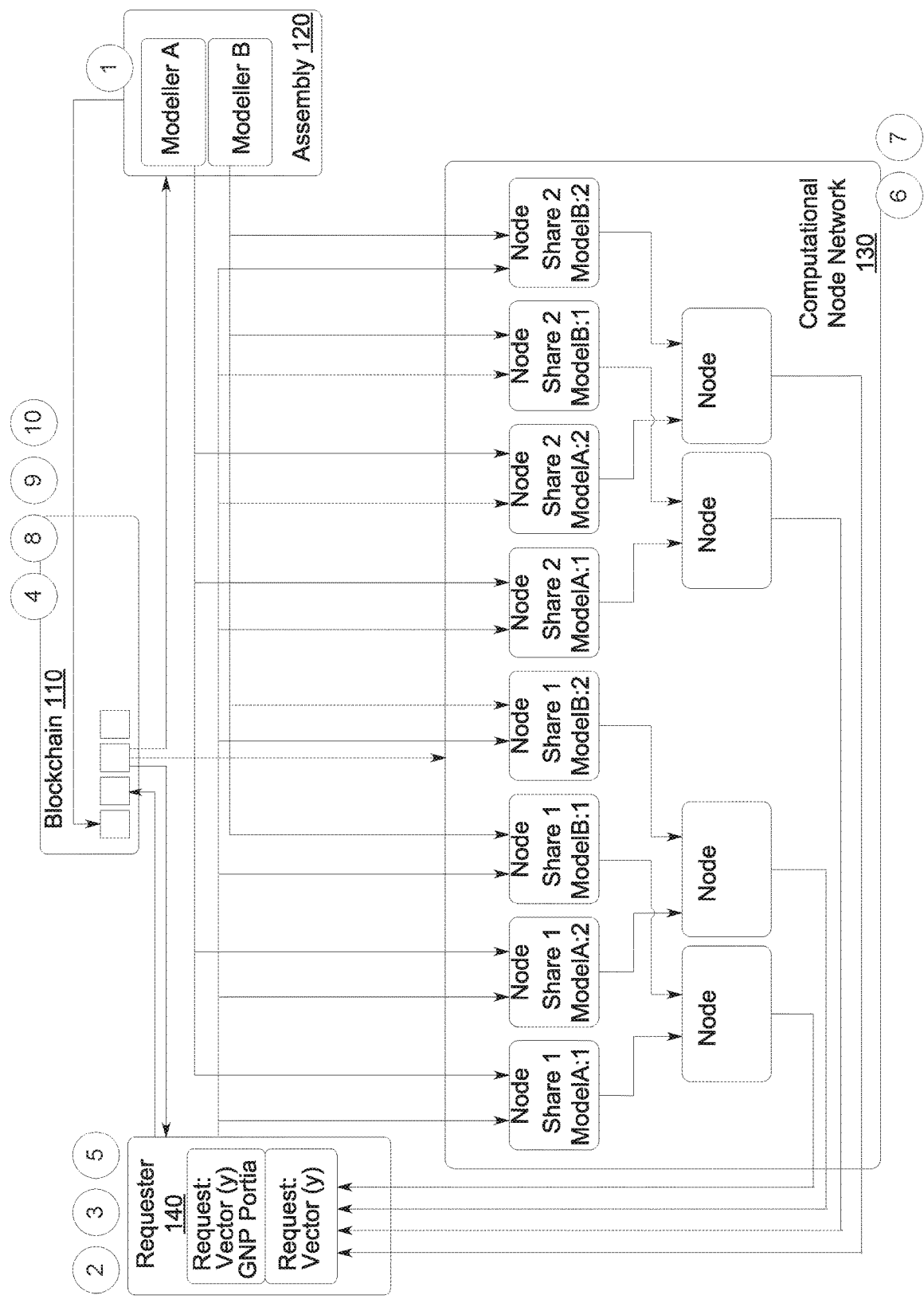
FIG. 2 is a distributed machine learning process using the illustrative system, in accordance with the embodiments disclosed herein.

FIG. 2 is a distributed machine learning process using the illustrative system, in accordance with the embodiments disclosed herein. The illustrative process may correspond with a financial application, although the same system could be used for almost any application or domain.

At block 1, assembly system 120 may create one or more smart contracts. The smart contracts may define the data structure of the features to be used, acceptable ranges for each feature, and/or the ensemble method to be used. Individual modelers with their own data may come together to form assembly system 120.

At block 2, requester system 140 may initiate a request for a prediction response to one of the entities in assembly system 120 or an external entity. Assembly system 120 may receive the request from requester system 140.

The request may be an electronic communication that corresponds with a question (e.g., "should I wear shorts today" or "should I purchase the financial equity at this price," etc.). The question may correspond with a characteristic. There may be one or more data parts in the request that can be parsed and/or cleaned.

At block 3, requester system 140 may provide a credit amount to the smart contract, input data (as predefined above), and proofs (e.g., valid model weight values, etc.) to blockchain devices 110. Blockchain devices 110 may distribute credits to accounts associated with both assembly 120 and computational node network 130. The credits may be associated with each data item showing that the data item is in a predefined range. In some examples, the proof may correspond with a Secret-shared, Non-Interactive Proofs (SNIPS).

Assembly 120 may determine one or more blockchain devices 110 that are related to the request from requester system 140.

At block 4, one or more blockchain devices 110 may send a contact identity (e.g., 40) to one or more nodes of computational node network 130. The nodes may be chosen to perform the prediction task (e.g., based on a weight corresponding with the characteristics of the request, based on the availability or capacity to process the request, etc.). In some examples, the nodes may be chosen randomly. In some examples, the nodes may be chosen if they are available for processing and/or not performing a different computation.

At block 5, requester system 140 and each computational node of computational node network 130 uses a secret sharing process to break each data item into a set of parts. The parts may be randomly selected. In some examples, the secret sharing process may correspond with a Shamir Secret Sharing (SSS).

Each data item may be transferred to one of the computational nodes of computational node network 130 via a communication network. For example, the communication network may correspond with a two-party protocol between a sender and a receiver, by which the sender transfers some information to the receiver and the sender remains oblivious to what information the receiver actually obtains. In some examples, the communication network may correspond with a secure data transfer protocol to transmit the data items between entities.

At block 6, each selected computational node of computational node network 130 may verify the input data via Secret-shared, Non-Interactive Proofs (SNIPS). Upon verification, the computational node of computational node network 130 may perform the required computations on their respective part of data using a combination of secret shared computational primitives.

A primitive construction process may enable computational nodes of computational node network 130 to perform functions on pieces of input data without revealing the input data, model data, or final prediction. For example, the primitive construction process may correspond with one or more modifications to Shamir's Secret Sharing protocol or other similar process. For example, the primitive construction process may allow for summation over multiple data items. To distribute the required data items, the system may implement an offline distribution to one or more nodes using a secure transfer protocol. Each data item may be within predefined ranges and model weights may satisfy privacy conditions are enabled via SNIPs. In some examples, parties may compute Message Authentication Codes (MAC) to add to each input (e.g., using the SPDZ® protocol). This may allow the verification of computation steps and can detect malicious activity. Data may be transferred via a secure protocol.

Ensemble learning techniques may correspond with meta-algorithms that combine the results of multiple models to generate a single prediction. An example of an ensemble learning technique is a weighted average of predictions where the weights are correlated to the previous performance of each modeler (any ensemble learning technique can be used with this system). The network of computational nodes may correspond with a peer-to-peer network with a secure communication channel between nodes using a public-key cryptography scheme (e.g. ECC®).

At block 7, the results are sent back to one or more blockchain devices 110. In some examples, inputs to the primitive construction process is a list of known participants with their IP address, smart contract address, information about the requests. The output of the primitive construction process may correspond with that would be assembled by the requester to get the prediction.

At block 8, one or more blockchain devices 110 may use the Message Authentication Codes (MACS) to validate computation. Upon validation, the blockchain network may combine the results via the detailed ensemble learning technique and weight.

At block 9, the final prediction may be returned to the requester of requester system 140 via a secure transfer protocol. For example, the final prediction may be an aggregation of the results from the computational nodes of computational node network 130 with weights applied to each of the results.

At block 10, output from the computation and predictions may be limited to the requester and not revealed to other parties, including the prediction providers. In this example, payments are distributed to the computational nodes of computational node network 130 and one or more of the entities in assembly system 120. After sometime, the requester system 140 may also reveal the answer (e.g., by submitting to the same smart contract) for future improvements. In this way, the weights of the ML model and/or other information can be adjusted for better performance. Output other than payment information is available without diverting from the essence of the disclosure.

Figure 3:
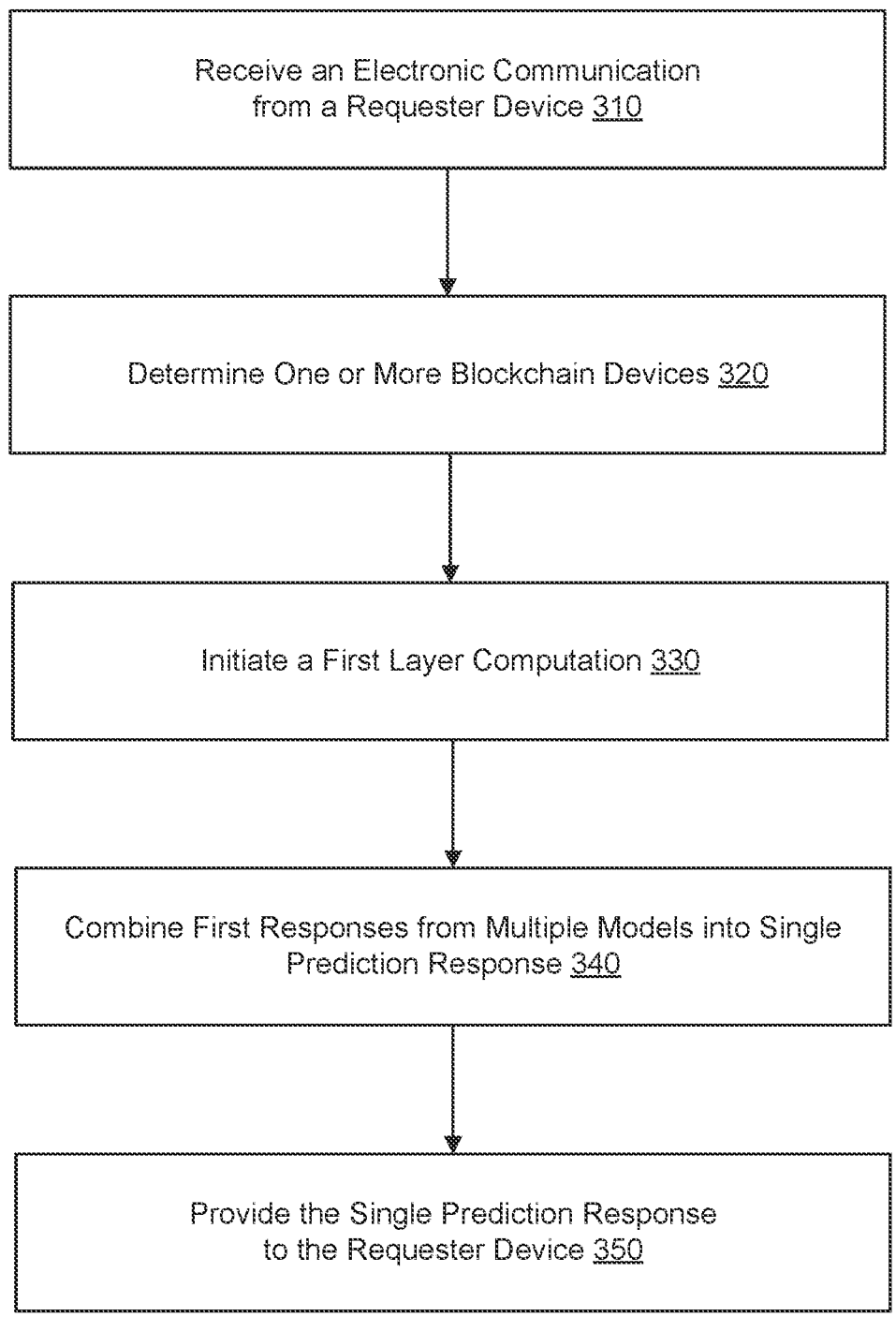
FIG. 3 provides an illustrative process, in accordance with the embodiments disclosed herein.

FIG. 3 provides an illustrative process for providing distributed machine learning, in accordance with the embodiments disclosed herein. The illustrative process may be executed by a computational layer platform 150 (e.g., assembly system 120 and/or computational node network 130, etc.) with one or more blockchain devices 110.

At block 310, an electronic communication can be received from a requester device. The electronic communication may be a request that corresponds with a question, input data, and a characteristic.

At block 320, one or more blockchain devices may be determined. The one or more blockchain devices may be related to the request. In some examples, the one or more blockchain devices can send a contact identity to one or more nodes of computational node network.

At block 330, a first layer computation may be initiated. For example, upon the requester device sends a shared secret to the one or more nodes of computational node network, the first layer computation may be initiated at each of the one or more nodes of computational node network. The one or more nodes of computational node network may each generate a first response to the question.

At block 340, each of the first response of multiple models may be combined into a single prediction response.

Figure 4:
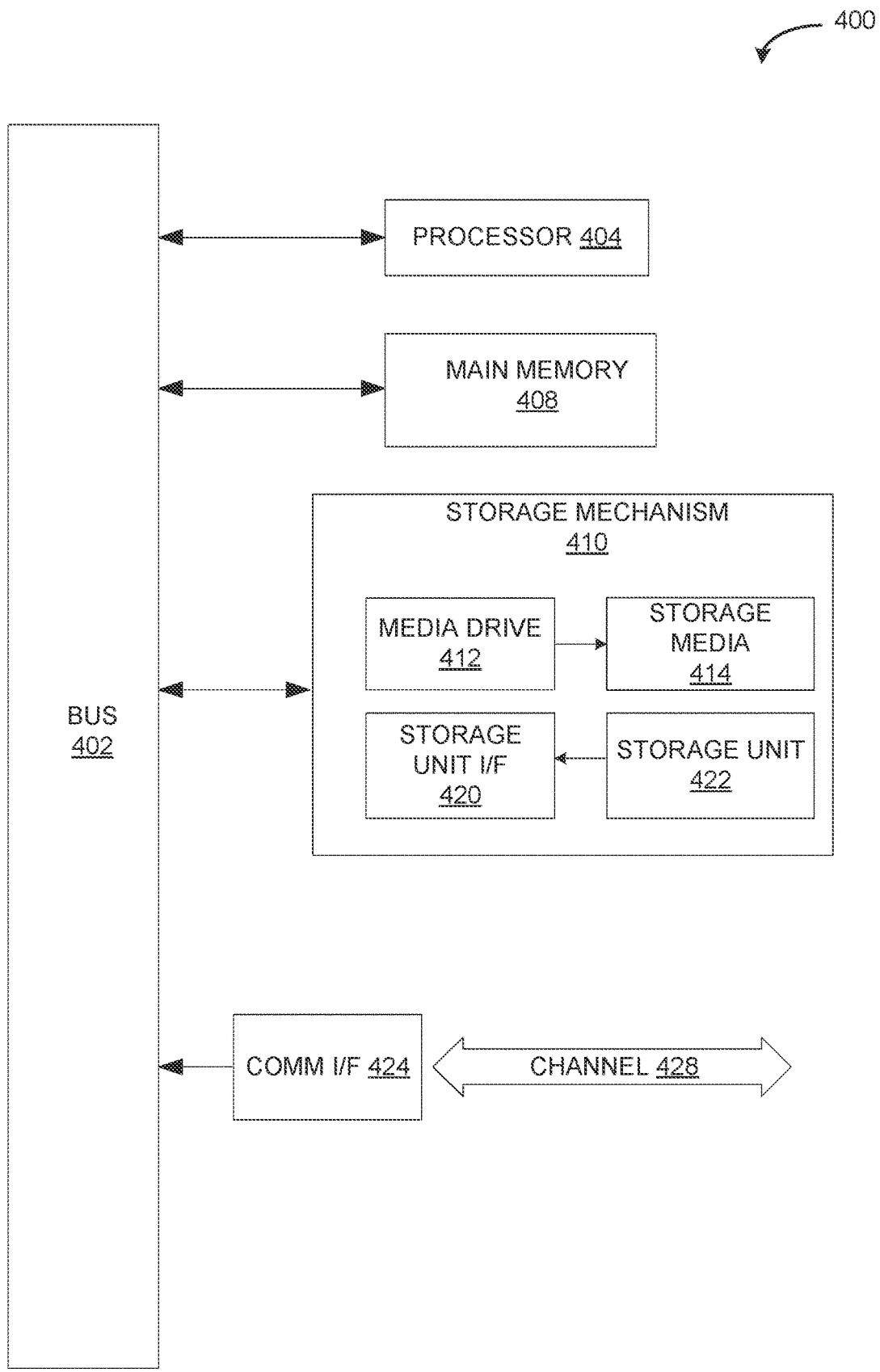
FIG. 4 is an example of a computing system that may be used in implementing various features of embodiments of the disclosed technology.

At block 350, the single prediction response may be provided to the requester device.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 4. Various embodiments are described in terms of this example logical circuit 400. After reading this description, it will become apparent to a person skilled in the relevant art how to implement the technology using other logical circuits or architectures.

Referring now to FIG. 4, computing system 400 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 400 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 400 might include, for example, one or more processors, controllers, control engines, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of logical circuit 400 or to communicate externally.

Computing system 400 might also include one or more memory engines, simply referred to herein as main memory 408. For example, preferably random-access memory (RAM) or other dynamic memory, might be used for storing information and instructions to be executed by processor 404. Main memory 408 might also be used for storing temporary variables or other intermediate information during execution of instructions to be executed by processor 404. Logical circuit 400 might likewise include a read only memory ("ROM") or other static storage device coupled to bus 402 for storing static information and instructions for processor 404.

The computing system 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to, or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into logical circuit 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory engine) and memory slot, a PCMCIA slot and card, and other fixed or removable storage units 422 and interfaces 420 that allow software and data to be transferred from the storage unit 422 to logical circuit 400.

Logical circuit 400 might also include a communications interface 424. Communications interface 424 might be used to allow software and data to be transferred between logical circuit 400 and external devices. Examples of communications interface 424 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 422, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 400 to perform features or functions of the disclosed technology as discussed herein.

Although FIG. 4 depicts a computer network, it is understood that the disclosure is not limited to operation with a computer network, but rather, the disclosure may be practiced in any suitable electronic device. Accordingly, the computer network depicted in FIG. 4 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for providing distributed machine learning, the method comprising:
receiving, at a controller device, an electronic communication from a requester device, wherein the electronic communication comprises a request that corresponds with a single response;
parsing and translating, by the controller device, the request to determine a set of machine learning (ML) models that are each associated with a different computing node;
executing each ML model in the set of ML models, each executed ML model determining a corresponding response in a first set of responses to the request;
providing each response of the first set of responses to the request to a computational layer configured to:
assign a corresponding weight to each response of the first set of responses, and
generate a single combined response to the request based on the weighted first set of responses to the request; and
providing, by the controller device to the requester device, the single combined response to the request.

2. The method of claim 1, wherein the first set of responses to the request and the single combined response to the request are binary responses.

3. The method of claim 1, wherein the different computing nodes are configured to:
   store a shared secret received with a verification process; and
   provide, to the computational layer, the shared secret with a first response among the first set of responses, wherein the shared secret confirms the permissibility of an entity corresponding to a computing node to provide the first response.

4. The method of claim 3, wherein the entity corresponding to the computing node is a distributed and anonymous computing node.

5. The method of claim 1, wherein the weights assigned to the first set of responses are based on a history of correct responses.

6. The method of claim 1, further comprising:
   determining a characteristic of the request; and
   limiting the weights assigned to the first set of responses to the determined characteristic.

7. The method of claim 1, wherein the request comprises input data that is provided to a proof that shows that the input data is in a predefined range.

8. The method of claim 7, wherein the proof corresponds to a Secret-shared, Non-Interactive Proofs (SNIPs).

9. A controller device for providing distributed machine learning, the controller device comprising:
   a memory; and
   one or more processors that are configured to execute machine readable instructions stored in the memory for performing operations to:
      receive an electronic communication from a requester device, wherein the electronic communication comprises a request that corresponds with a single response;
      parse and translate the request to determine a set of machine learning (ML) models that are each associated with a different computing node;
      execute each ML model in the set of ML models, each executed ML model determining a corresponding response in a first set of responses to the request;
      provide each response of the first set of responses to the request to a computational layer configured to:
         assign a corresponding weight to each response of the first set of responses, and
         generate a single combined response to the request based on the weighted first set of responses to the request; and
      provide, to the requester device, the single combined response to the request.

10. The controller device of claim 9, wherein the first set of responses to the request and the single combined response to the request are binary responses.

11. The controller device of claim 9, wherein the different computing nodes are configured to:
   store a shared secret received with a verification process; and
   provide, to the computational layer, the shared secret with a first response among the first set of responses, wherein the shared secret confirms the permissibility of an entity corresponding to a computing node to provide the first response.

12. The controller device of claim 11, wherein the entity corresponding to the computing node is a distributed and anonymous computing node.

13. The controller device of claim 9, wherein the weights assigned to the first set of responses are based on a history of correct responses.

14. The controller device of claim 9, wherein the operations are further to:
   determine a characteristic of the request; and
   limit the weights assigned to the first set of responses to the determined characteristic.

15. The controller device of claim 9, wherein the request comprises input data that is provided to a proof that shows that the input data is in a predefined range.

16. The controller device of claim 15, wherein the proof corresponds to a Secret-shared, Non-Interactive Proofs (SNIPs).

17. A non-transitory computer-readable storage medium storing a plurality of instructions executable by one or more processors, the plurality of instructions when executed by the one or more processors causing the one or more processors to:
   receive, at a controller device, an electronic communication from a requester device, wherein the electronic communication comprises a request that corresponds with a single response;
   parse and translate, by the controller device, the request to determine a set of machine learning (ML) models that are each associated with a different computing node;
   execute each ML model in the set of ML models, each executed ML model determining a corresponding response in first set of responses to the request;
   provide each response of the first set of responses to the request to a second computational layer configured to:
      assign a corresponding weight to each response of the first set of responses, and
      generate a single combined response to the request based on the weighted first set of responses to the request; and
   provide, by the controller device to the requester device, the single combined response to the request.

18. The non-transitory computer-readable storage medium of claim 17, wherein the first set of responses to the request and the single combined response to the request are binary responses.

19. The non-transitory computer-readable storage medium of claim 17, wherein the plurality of instructions further cause the one or more processors to:
   store a shared secret received with a verification process; and
   provide, to the computational layer, the shared secret with a first response among the first set of responses, wherein the shared secret confirms the permissibility of an entity corresponding to a computing node to provide the first response.

20. The non-transitory computer-readable storage medium of claim 17, wherein the plurality of instructions further cause the one or more processors to:
   determine a characteristic of the request; and
   limit the weights assigned to the first set of responses to the determined characteristic.

* * * * *

UNITED STATES PATENT AND TRADEMARK OFFICE
CERTIFICATE OF CORRECTION

| | |
|---|---|
| PATENT NO. | : 11,792,010 B2 |
| APPLICATION NO. | : 17/666801 |
| DATED | : October 17, 2023 |
| INVENTOR(S) | : Seraj et al. |

It is certified that error appears in the above-identified patent and that said Letters Patent is hereby corrected as shown below:

In the Specification

In Column 1, Line 66, delete "to." and insert --to-- therefor

In Column 3, Line 30, delete "lo" and insert --to-- therefor

In Column 7, Line 61, delete "(SNIPS)." and insert --(SNIPs).-- therefor

In Column 8, Line 26, delete "(SNIPS)." and insert --(SNIPs).-- therefor

In Column 8, Line 44, delete "(MAC)" and insert --(MACs)-- therefor

In Column 8, Line 67, delete "(MACS)" and insert --(MACs)-- therefor

In the Claims

In Column 14, Line 33, In Claim 17, before "first", insert --a--

In Column 14, Line 35, In Claim 17, before "computational", delete "second"

Signed and Sealed this
Fifth Day of November, 2024

Katherine Kelly Vidal
*Director of the United States Patent and Trademark Office*